United States Patent [19]
Wen-Hung

[11] Patent Number: 5,954,437
[45] Date of Patent: Sep. 21, 1999

[54] COMPUTER KEYBOARD SYSTEM ENABLING USERS TO LOCATE KEYS OF LETTERS, RADICALS AND PHONETIC SYMBOLS QUICKLY

[76] Inventor: Hsia Wen-Hung, 23, Lane 278, Wu Chuan South Rd., Taichung, Taiwan

[21] Appl. No.: 09/020,412

[22] Filed: Feb. 9, 1998

[51] Int. Cl.[6] .................................................. B41J 5/10
[52] U.S. Cl. .......................................... 400/487; 400/484
[58] Field of Search ................................. 400/484, 487, 400/488, 110

[56] References Cited

U.S. PATENT DOCUMENTS

| | | | |
|---|---|---|---|
| 662,834 | 11/1900 | Tcherkassov | 400/487 |
| 1,319,687 | 10/1919 | Bates | 400/487 |
| 3,927,752 | 12/1975 | Jones et al. | 400/487 |
| 4,602,878 | 7/1986 | Merner et al. | 400/487 |
| 4,715,736 | 12/1987 | McGunnigle | 400/484 |
| 5,212,638 | 5/1993 | Bernath | 400/484 |
| 5,236,268 | 8/1993 | Chang | 400/484 |
| 5,452,960 | 9/1995 | Kuhlenschmidt | 400/487 |
| 5,660,488 | 8/1997 | Miller | 400/488 |

FOREIGN PATENT DOCUMENTS 134703  9/1933  Australia ................. 400/487

OTHER PUBLICATIONS

Keyboard, LC Smith adn Corona Typewriters Inc., 1935.

*Primary Examiner*—Edgar Burr
*Assistant Examiner*—Leslie Grohusky
*Attorney, Agent, or Firm*—Bacon & Thomas, PLLC

[57] ABSTRACT

A computer keyboard consists of keys which are arranged in groups according to five different patterns for enhancing the key-in efficiency. The first and the second patterns are respectively composed of four sets of specific keys which are arranged in group and covered with four different colors. The third and fourth patterns consist respectively of five sets of specific keys which are grouped and covered with five different colors. The fifth pattern consists of seven sets of specific keys which are grouped and covered with seven different colors.

10 Claims, 17 Drawing Sheets

1

COMPUTER KEYBOARD SYSTEM ENABLING USERS TO LOCATE KEYS OF LETTERS, RADICALS AND PHONETIC SYMBOLS QUICKLY

FIELD OF THE INVENTION

The present invention relates generally to a computer keyboard, and more particularly to a computer keyboard consisting of rows of keys which are so arranged as to enable the computer user to locate the keys of letters, radicals and phonetic symbols quickly.

BACKGROUND OF THE INVENTION

Most people harbor a computerphobia for various reasons. One of the reasons is that the computer keyboard consists of rows keys, which tend to bewilder those people who are in fact potential user of the computer. In addition, the complexity of the computer keyboard can discourage the first-time users of the computer. Moreover, the conventional computer keyboard is generally defective in design in that it requires a first-time user of the computer to spend a long period of time learning to quickly locate the keys of various letters, radicals and phonetic symbols. In a nutshell, the conventional computer keyboard is inefficient at best.

SUMMARY OF THE INVENTION

It is therefore the primary objective of the present invention to provide an improved computer keyboard system which user-friendly.

It is another objective of the present invention to provide an improved computer keyboard system capable of improving the key-in efficiency.

In keeping with the principle of the present invention, the foregoing objectives of the present invention are attained by a computer keyboard system consisting of rows of keys which are arranged in five patterns. The first and second patterns are respectively composed of four sets of specific keys which are arranged in groups and covered with four different colors. The third and the fourth patterns consist respectively of five sets of specific keys which are arranged in groups and covered with five different colors. The fifth pattern consists of seven sets of specific keys arranged in groups and covered with seven different colors. The computer keyboard system is user-friendly and capable of enhancing the key-in efficiency.

The foregoing objectives, features, functions, and advantages of the present invention will be more readily understood upon a thoughtful deliberation of the following detailed description of the present invention with reference to the accompanying drawings

DETAILED DESCRIPTION OF THE INVENTION

Figure 1:
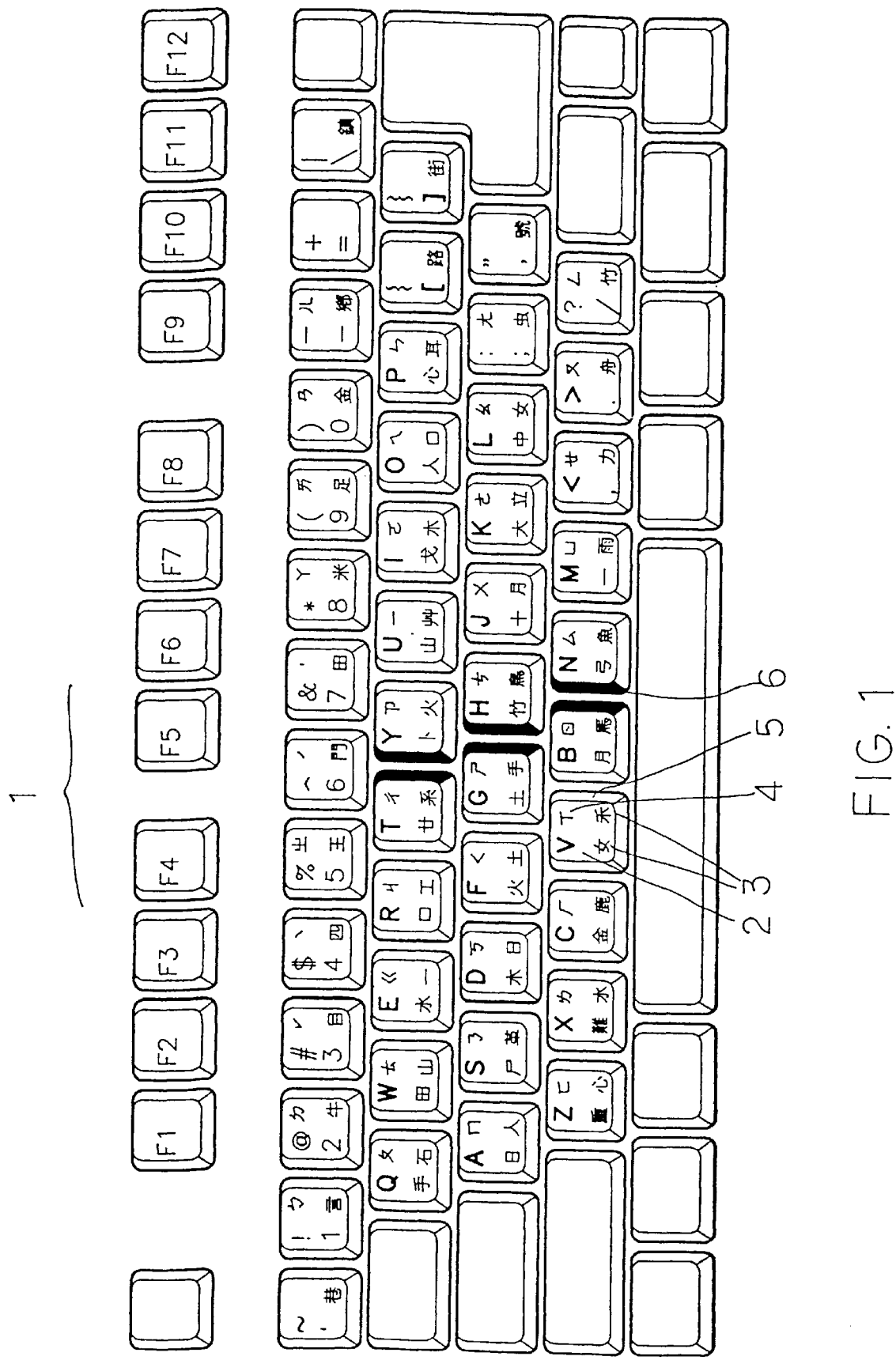
FIG. 1 shows a schematic view of a computer keyboard consisting of rows of keys.

As shown in FIGS. 1–17, a computer keyboard 1 embodied in the present invention consists of keys 11 which are provided respectively with an English letter 2, and radical 3, and phonetic symbol 3. The computer keyboard 1 is divided into a left-hand area and a right-hand area by a demarcation line 6 which is made up of keys having respectively the English letters of T, G, B on the left-hand area, and the English letters of Y, H, N on the right-hand area. The sides of the keys of the demarcation line 6 are conspicuously painted with a predetermined color. The computer keyboard 1 of the present invention is divided into the left-hand area and the right-hand area to enhance the key-in efficiency. The keys having the English letters 2 are arranged in groups such that the keys of each group are associated with a specific color which may be the color of the English letter 2, the radical 3, or the phonetic symbol 4. The keys of the computer keyboard 1 of the present invention are grouped into five patterns.

The first pattern includes four sets of specific key groups, which are identified by four different colors.

The second pattern includes another four sets of specific key groups, which are identified by four different colors.

The third pattern includes five sets of specific key groups, which are identified by five different colors.

The fourth pattern includes another five sets of specific key groups, which are identified by five different colors.

The fifth pattern includes seven sets of specific key groups, which are identified by seven different colors.

Figure 2:
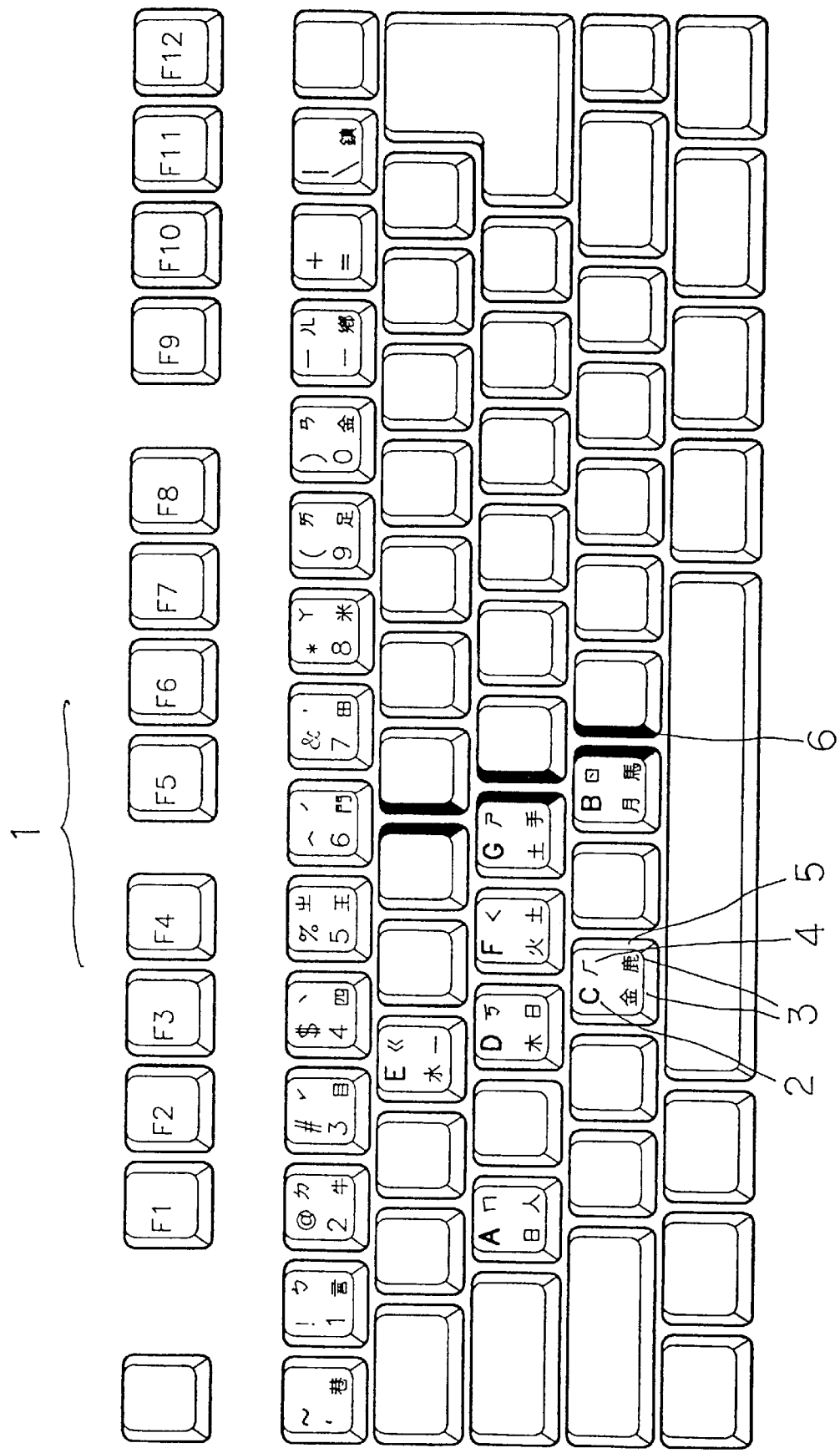
FIG. 2 shows a schematic view of a computer keyboard consisting of keys arranged in group on the basis of seven English letters of A, B, C, D, E, F, and G.
Figure 3:
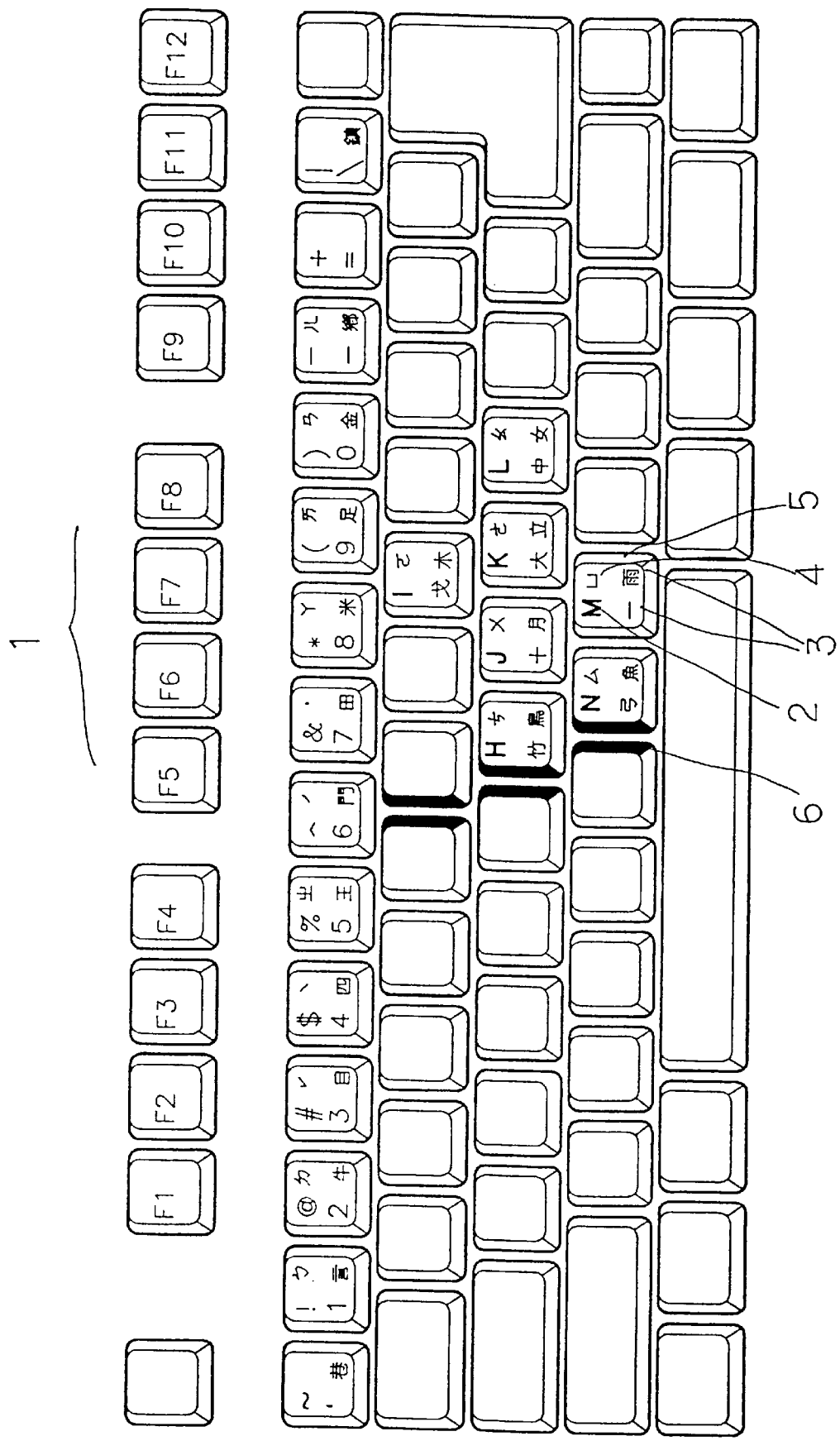
FIG. 3 shows a schematic view of the computer keyboard consisting of keys arranged in group on the basis of seven English letters of H, I, J, K, L, M, and N.
Figure 4:
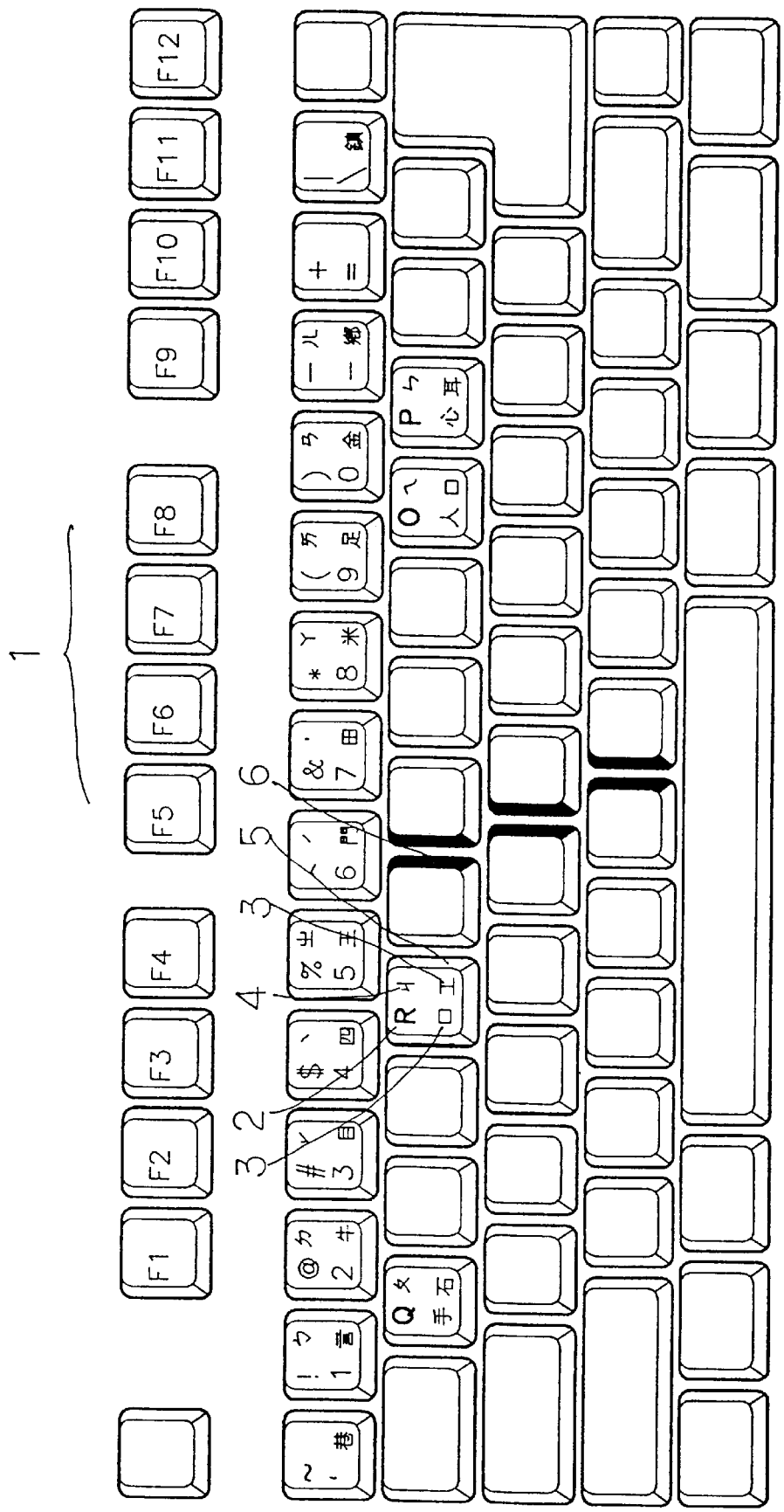
FIG. 4 shows a schematic view of the computer keyboard consisting of keys arranged in group on the basis of four English letters of O, P, Q, and R.
Figure 5:
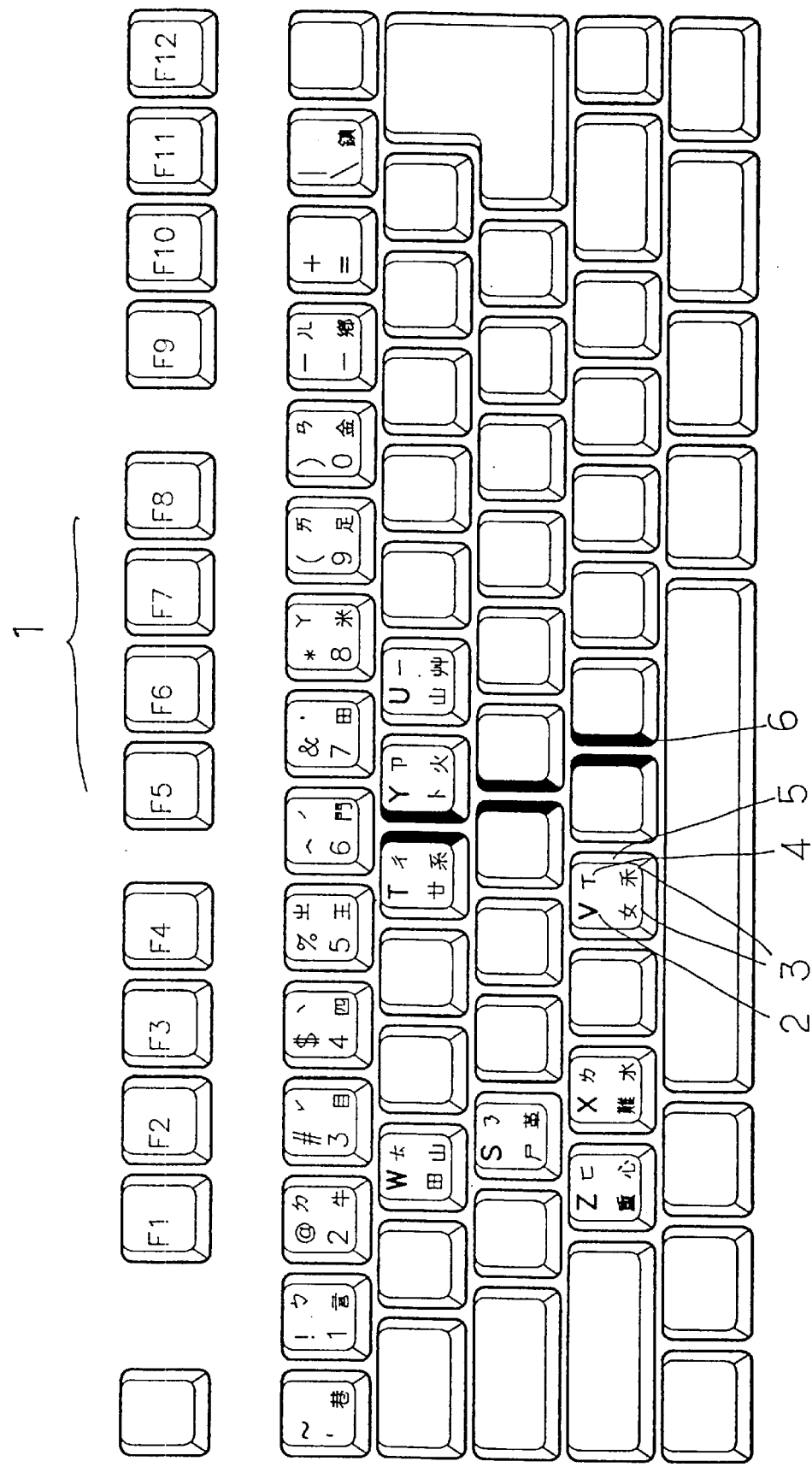
FIG. 5 shows a schematic view of the computer keyboard consisting of keys arranged in group on the basis of eight English letters of S, T, U, V, W, X Y, and Z.

The specific keys 5 of the first pattern are formed of seven English letters of A, B, C, D, E, F, and G, which are covered with the same color, as shown in FIG. 2. Another set of specific keys 5 is formed of seven English letters of H, I, J, K, L, M, and N, which are covered with the same color, as shown in FIG. 3. Similarly, four keys 5 of the English letters of O, P, Q, and R are covered with the same colors, as shown in FIG. 4. Eight keys 5 of the English letters of S, T, U, V, W, x Y, and Z are covered with the same colors, as shown in FIG. 5.

Figure 8:
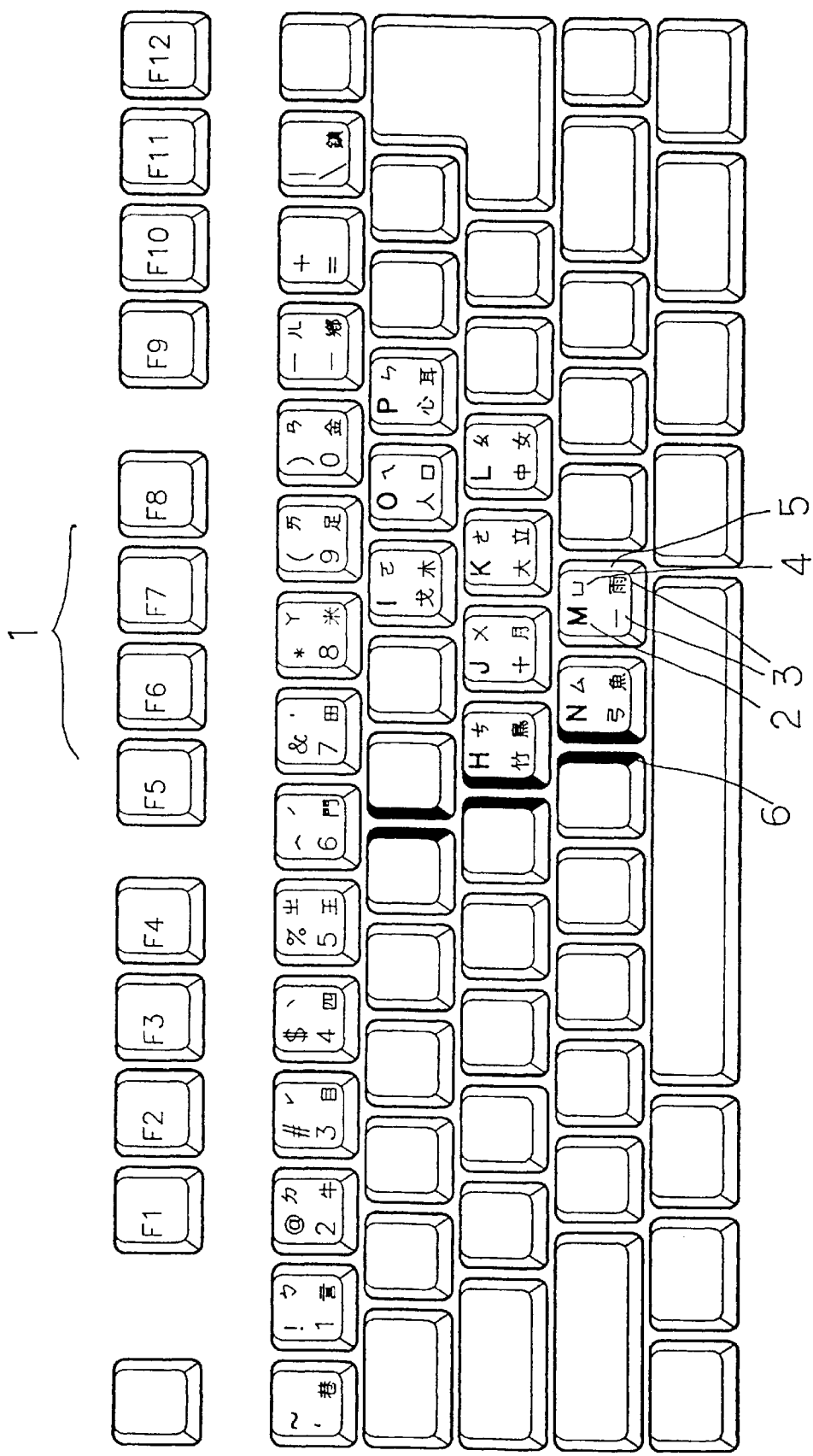
FIG. 8 shows a schematic view of the computer keyboard consisting of keys arranged in group on the basis of nine English letters of H, I, J, K, L, M, N, O, and P.
Figure 9:
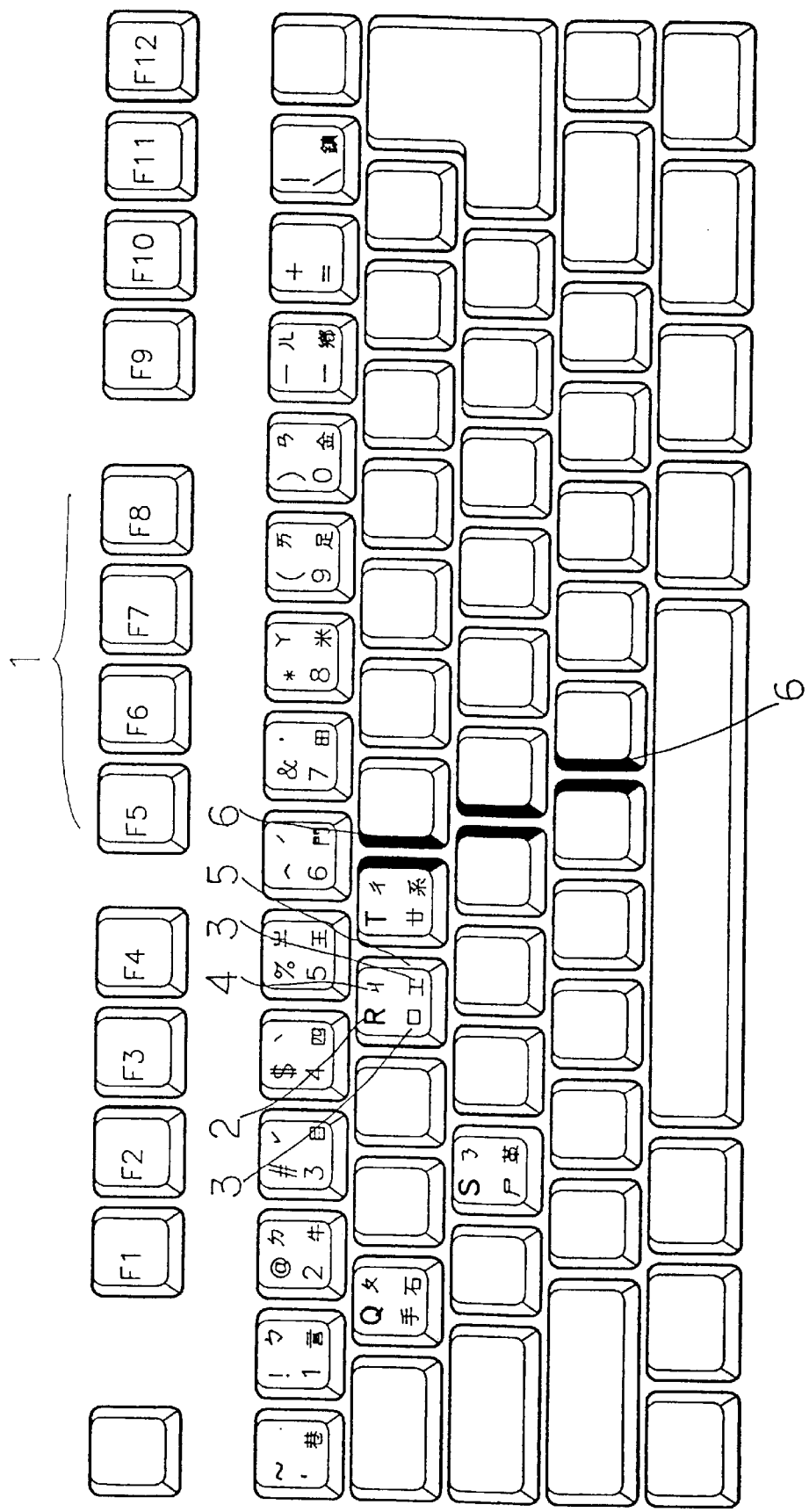
FIG. 9 shows a schematic view of the computer keyboard consisting of keys arranged in group on the basis of four English letters of Q, R, S, and T.
Figure 16:
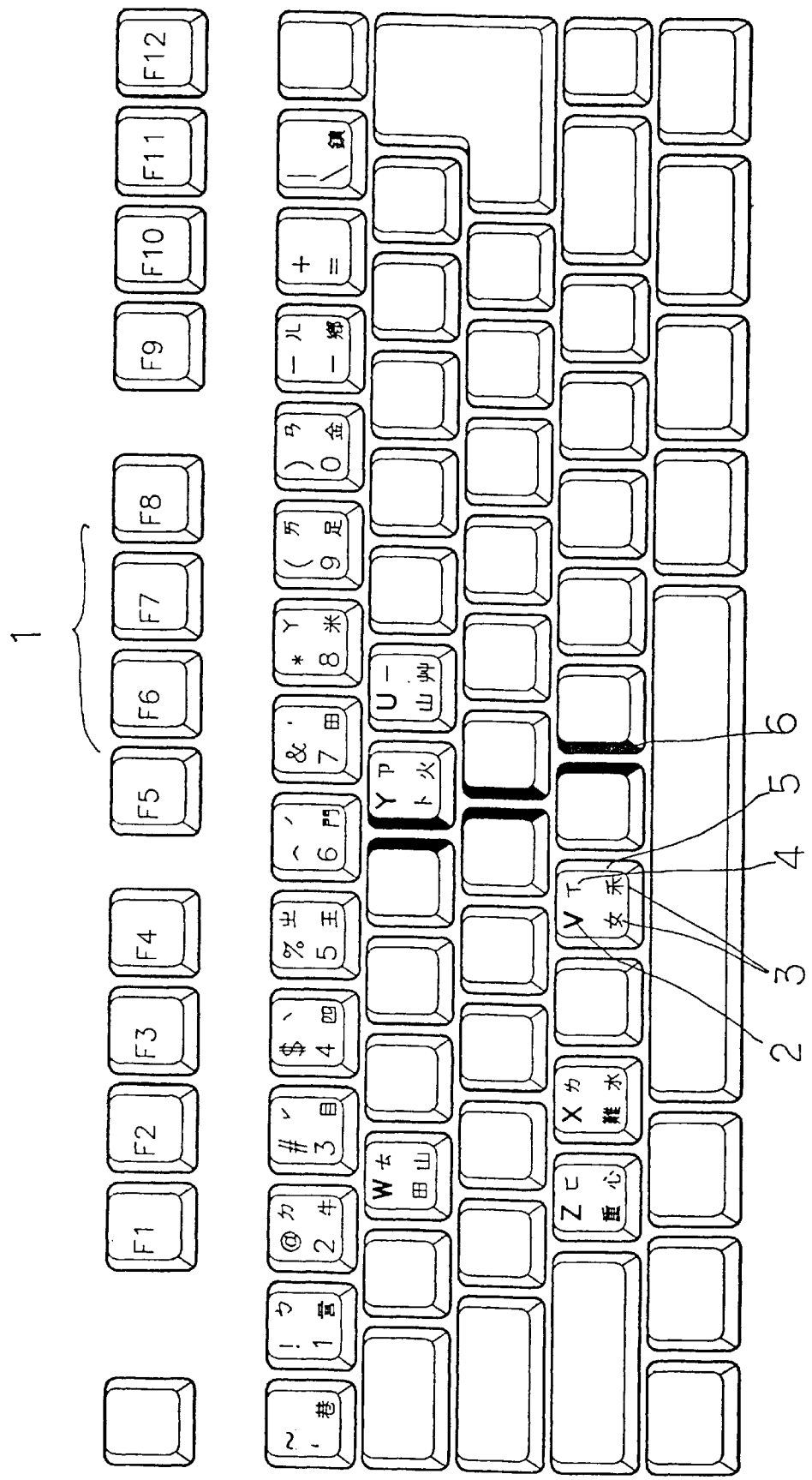
FIG. 16 shows a schematic view of the computer keyboard consisting of keys arranged in group on the basis of six English letters of U, V, W, X, Y, and Z.
Figure 17:
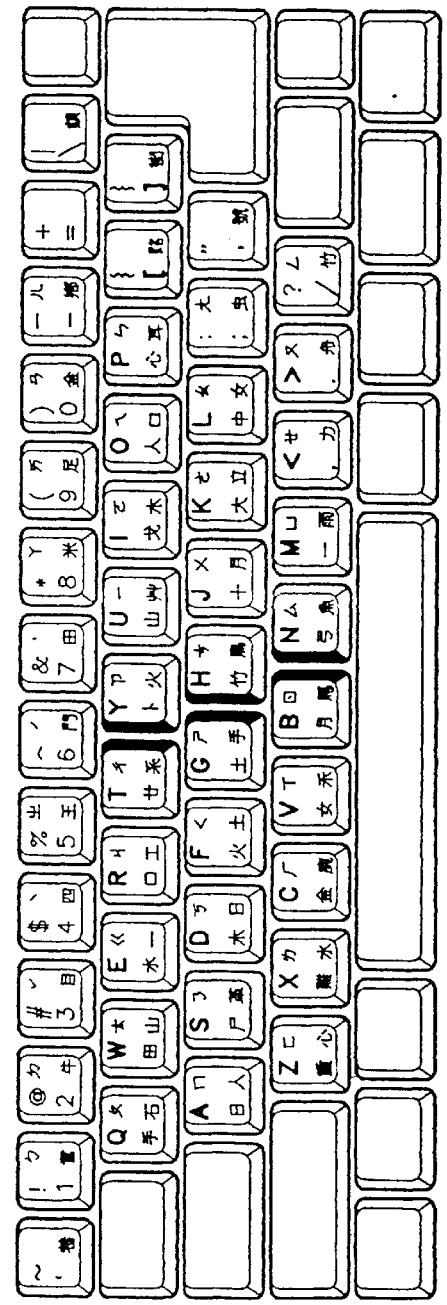
FIG. 17 shows a schematic view of the computer keyboard consisting of keys arranged in groups in the left-hand area and the right-hand area.

The second kind of the keyboard includes a set formed of seven English letters of A, B, C, D, E, F, and G, which are covered with the same color, as shown in FIG. 2, a set formed of nine English letters of H, I, J, K, L, M, N, O, and P, which are covered with the same color, as shown in FIG. 8, a set formed of four English letters of Q, R, S, and T, which are similarly colored, as shown in FIG. 9, and a set formed of six English letters of U, V, W, X, Y, and Z, which are similarly colored, as shown in FIG. 16.

Figure 6:
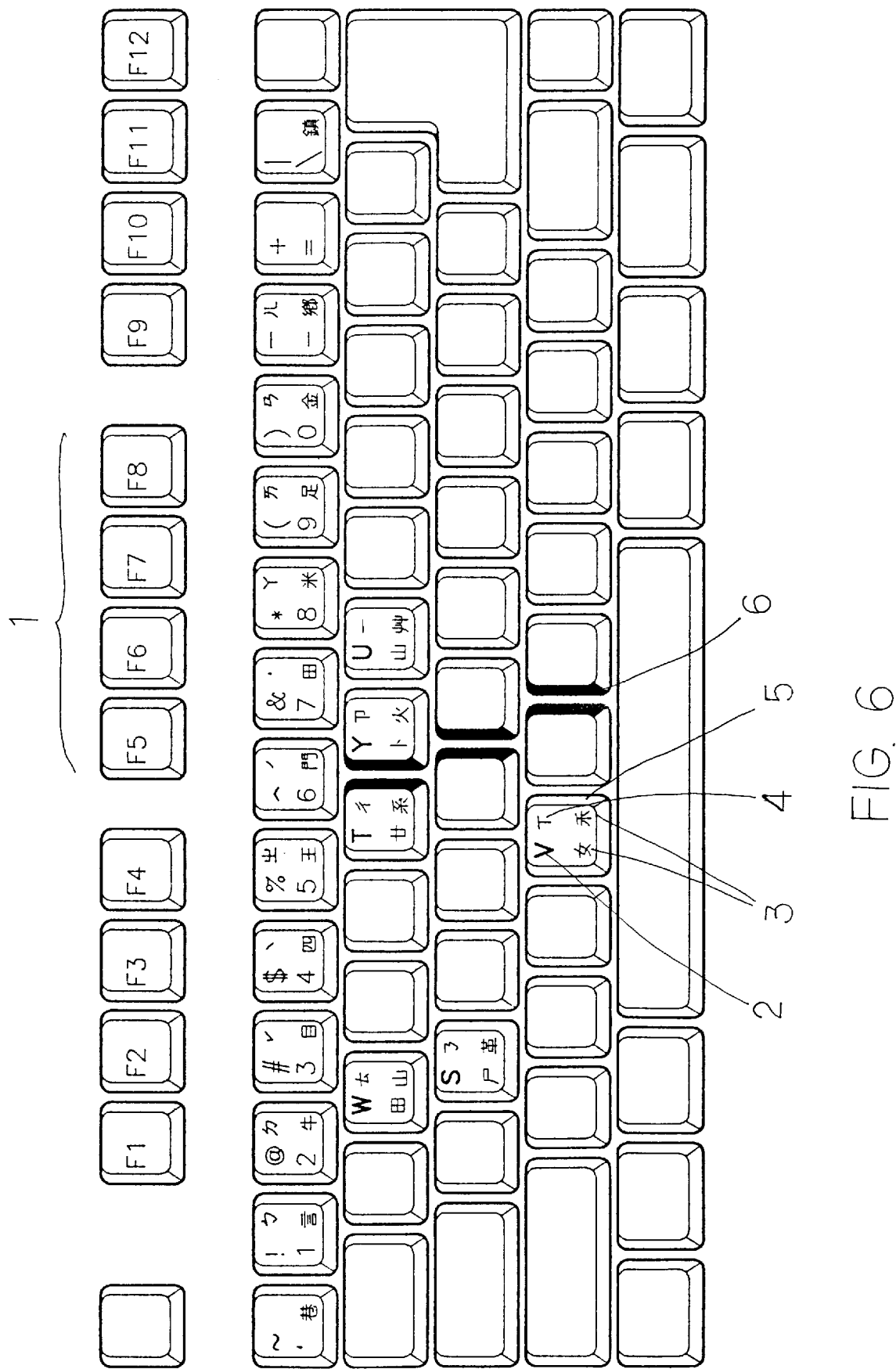
FIG. 6 shows a schematic view of the computer keyboard consisting of keys arranged in group on the basis of six English letters of S, T, U, V, W, and Y.
Figure 7:
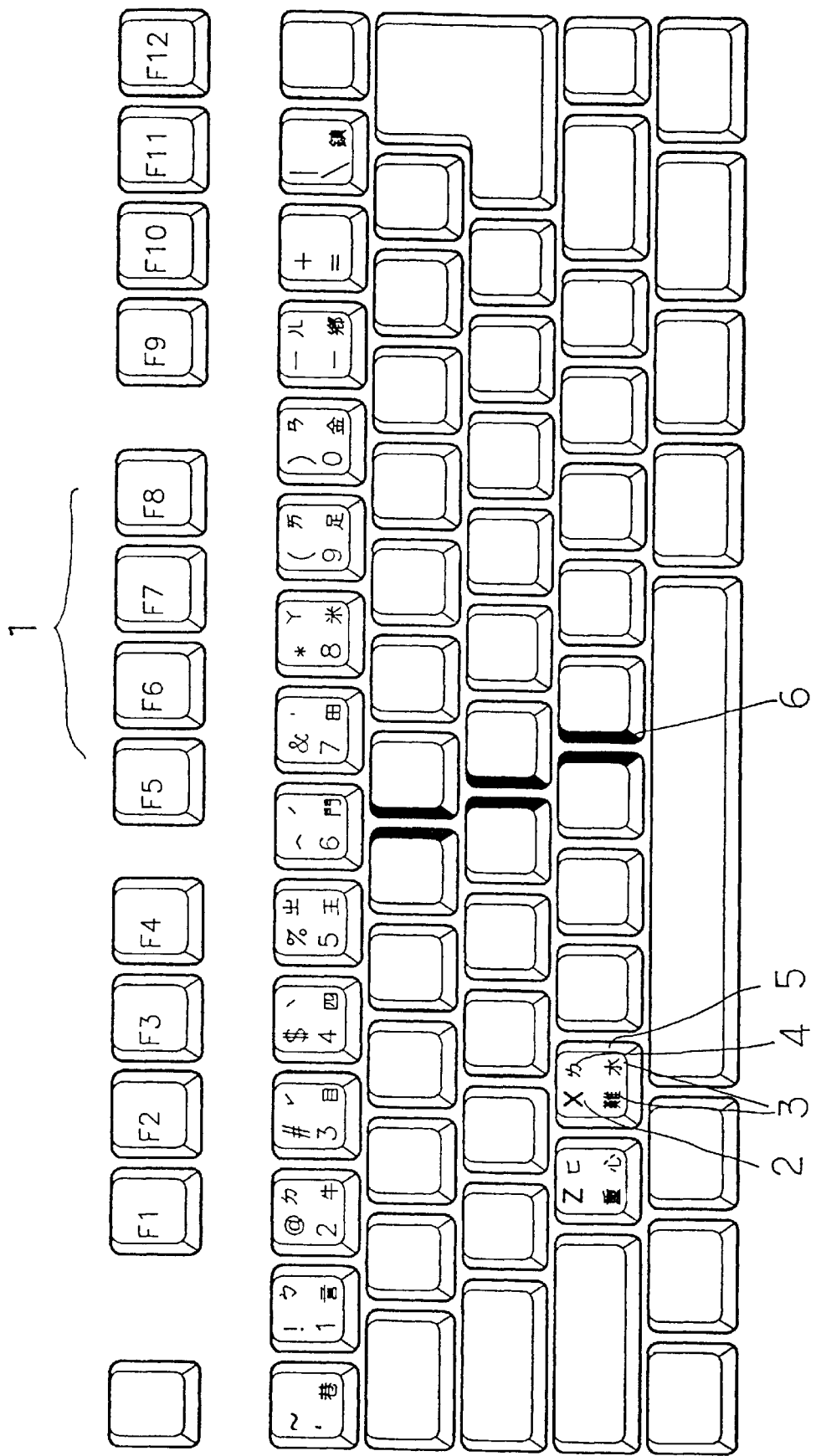
FIG. 7 shows a schematic view of the computer keyboard consisting of keys arranged in group on the basis of two English letters of Z and X.

The third kind of the keyboard includes a set formed of seven English letters of A, B, C, D, E, F, and G, which are similarly colored, as shown in FIG. 2, a set of seven keys 5 of seven English letters of H, I, J, K, L, M, and N, which are similarly colored, as shown in FIG. 3, a set of four keys 5 of four English letters of O, P, Q, and R, which are similarly colored, as shown in FIG. 4, and a set of six keys 5 of six English letters of S, T, U, V, W, and Y, which are similarly colored, as shown in FIG. 6, a set of two keys S of two English letters of Z and X, which are similarly colored, as shown in FIG. 7.

Figure 10:
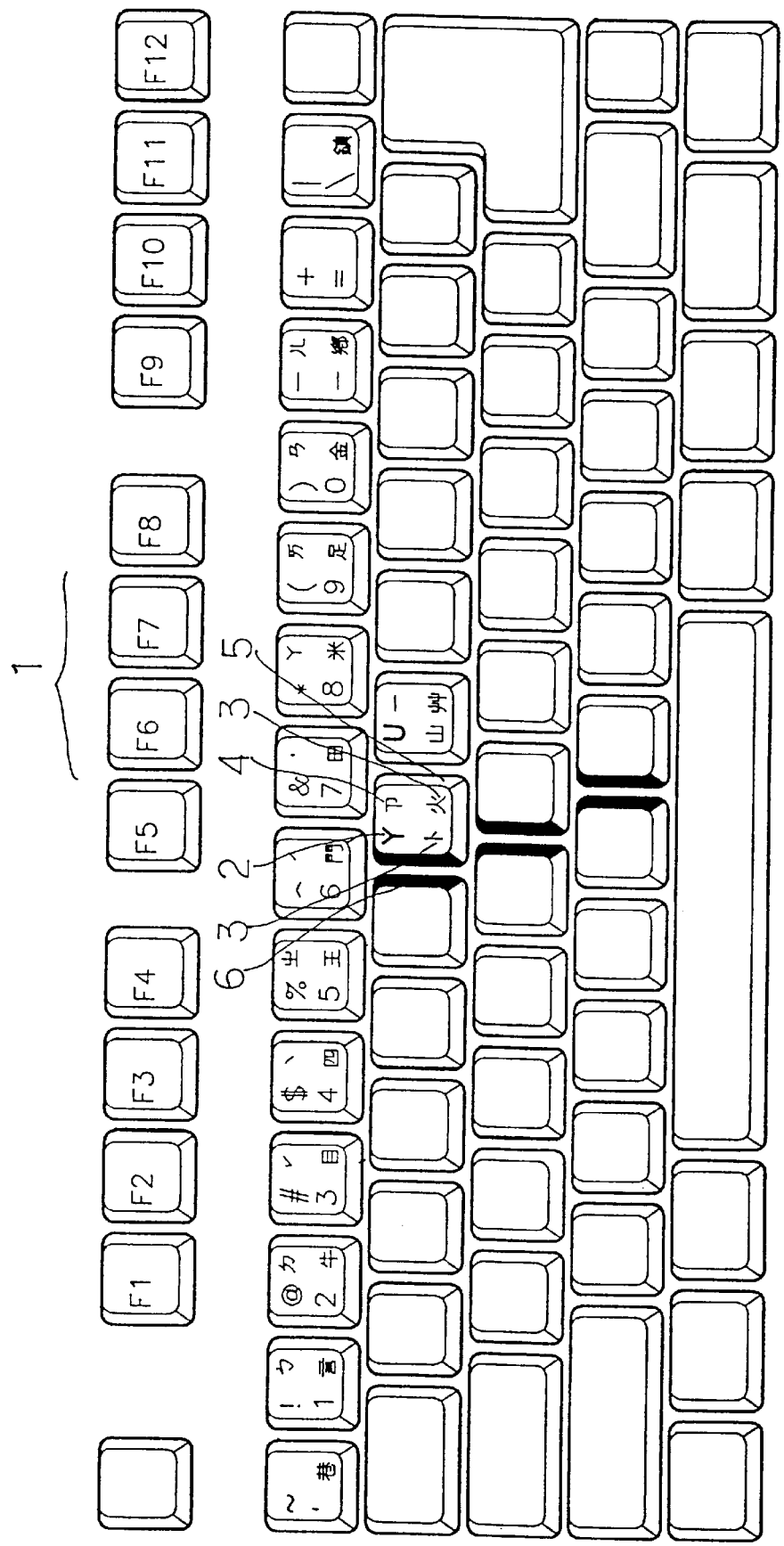
FIG. 10 shows a schematic view of the computer keyboard consisting of keys arranged in group on the basis of two English letters of Y and U.
Figure 11:
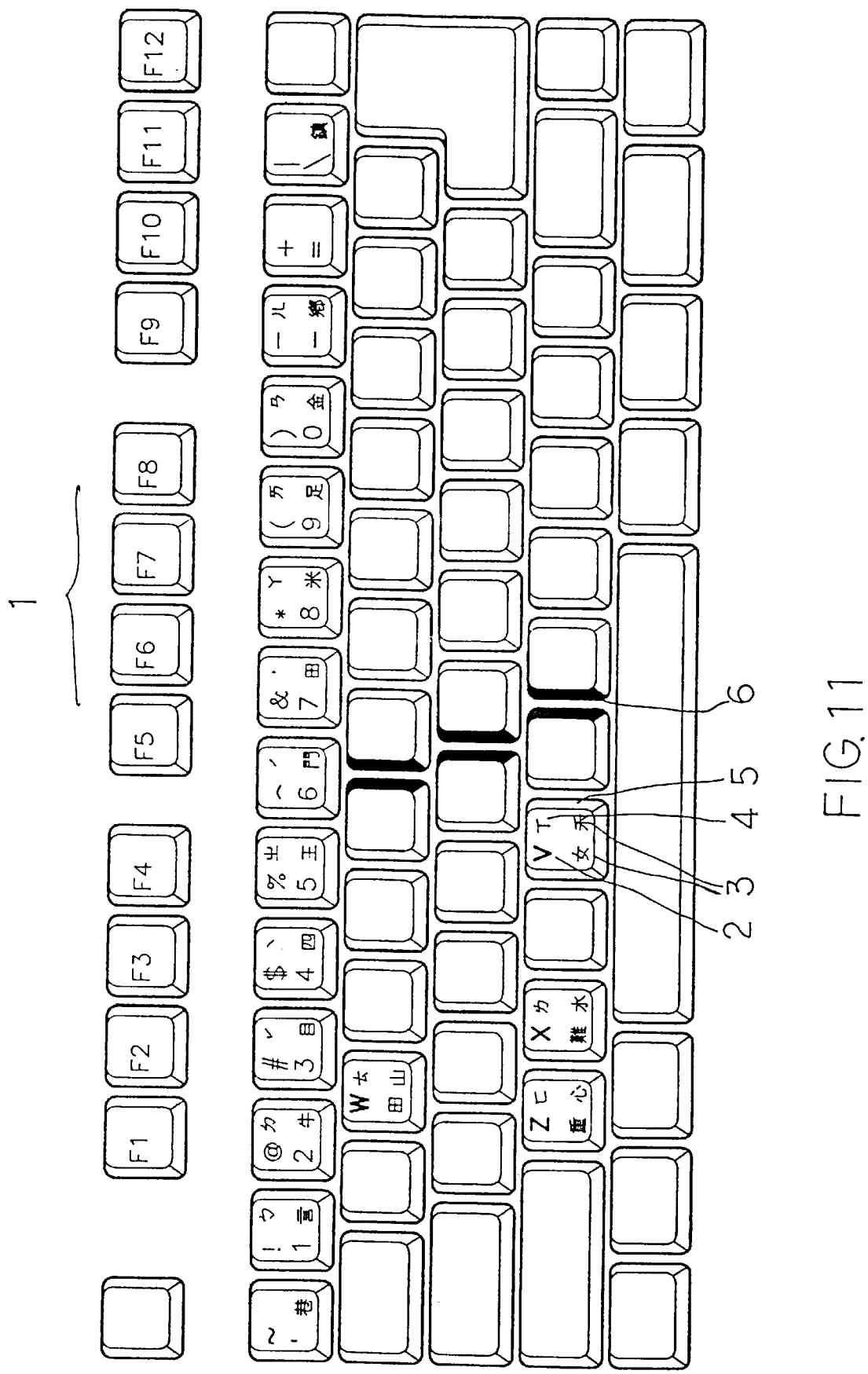
FIG. 11 shows a schematic view of the computer keyboard consisting of keys arranged in group on the basis of four English letters of V, W, Z, and X.

The fourth kind of the keyboard includes a set of seven keys 5 of seven English letters of A, B, C, D, E, F, and G, which are similarly colored, as shown in FIG. 2, a set nine of keys 5 of nine English letters of H, I, J, K, L, M, N, O, and P, which are similarly colored, as shown in FIG. 8, a set of four keys 5 of four English letters of Q, R, S, and T, which are similarly colored, as shown in FIG. 9, a set of two keys 5 of English letters of U and Y, which are similarly colored, as shown in FIG. 10, and a set of four keys 5 of four English letters of V, W, Z, and X, which are similarly colored, as shown in FIG. 11.

Figure 12:
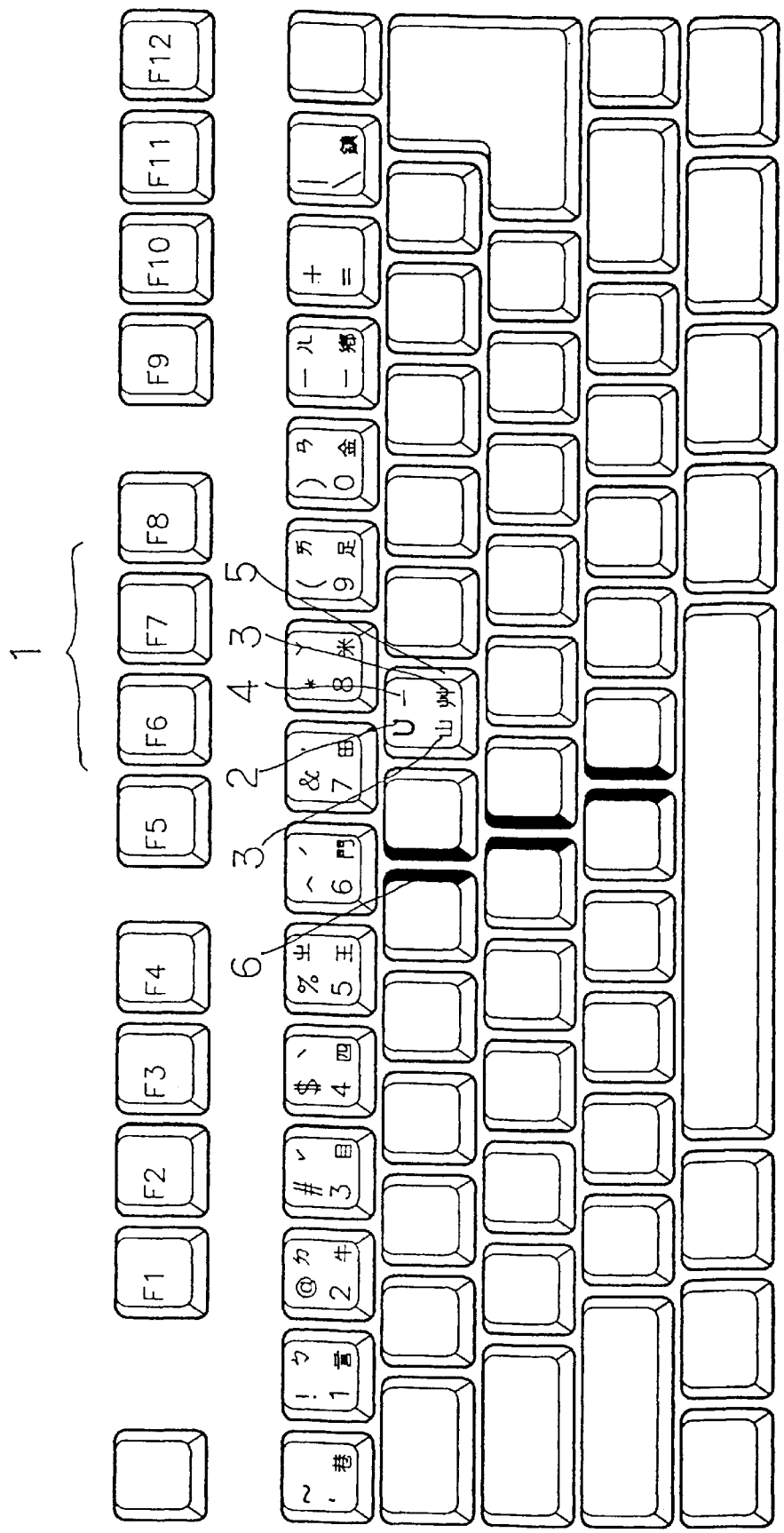
FIG. 12 shows a schematic view of the computer keyboard consisting of a key group on the basis of one English letter of U.
Figure 13:
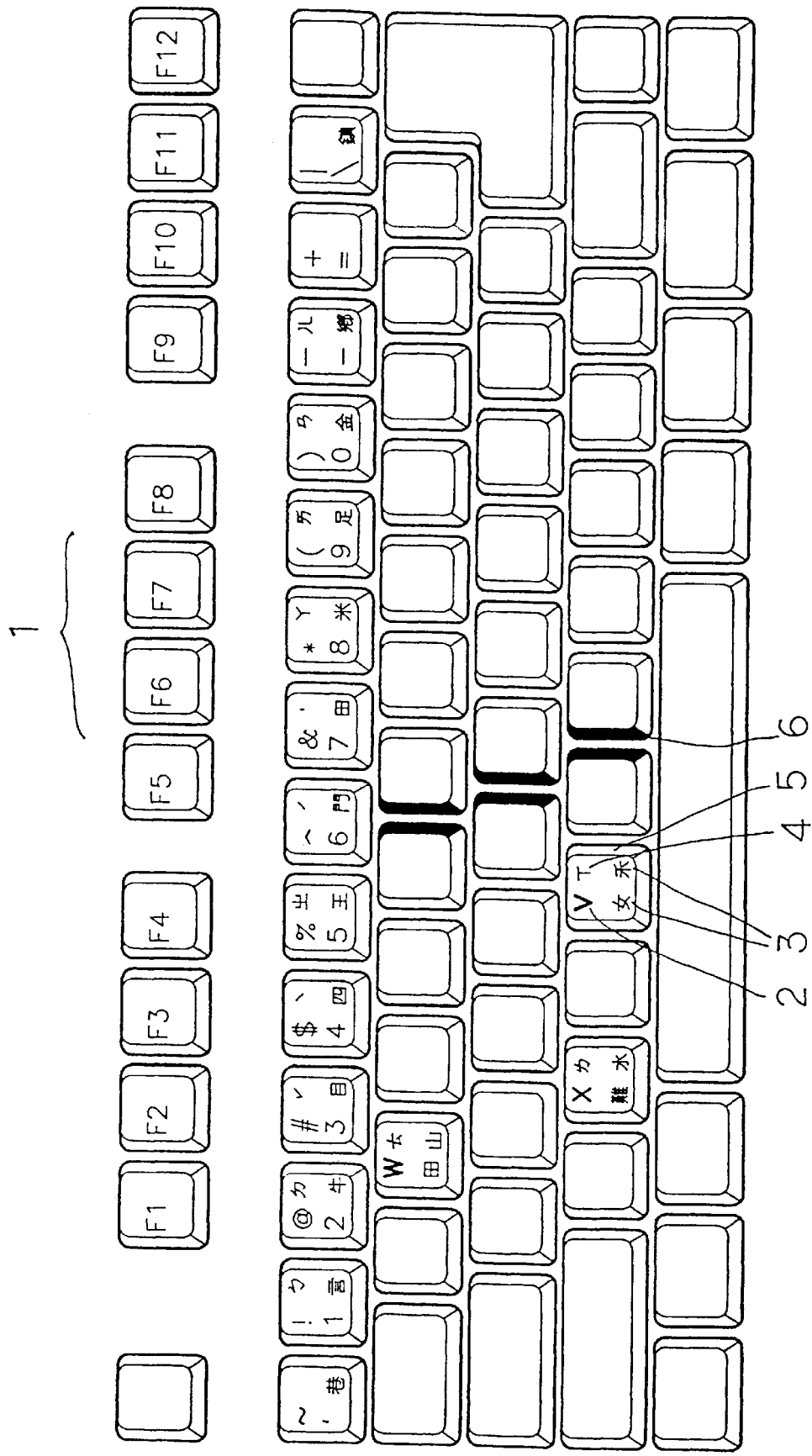
FIG. 13 shows a schematic view of the computer keyboard consisting of keys arranged in group on the basis of three English letters of V, W, and X.
Figure 14:
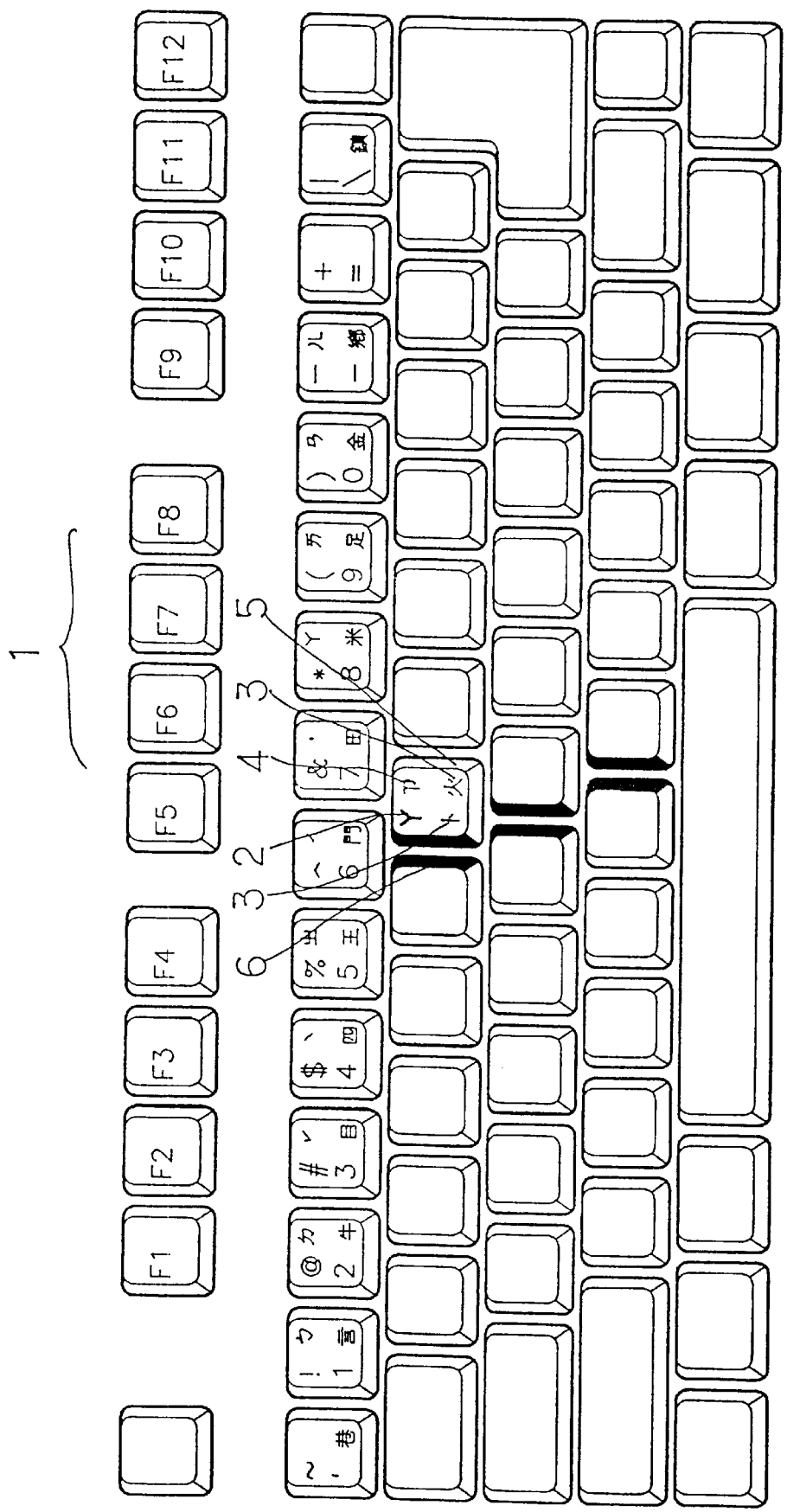
FIG. 14 shows a schematic view of the computer keyboard consisting of a key group on the basis of one English letters of Y.
Figure 15:
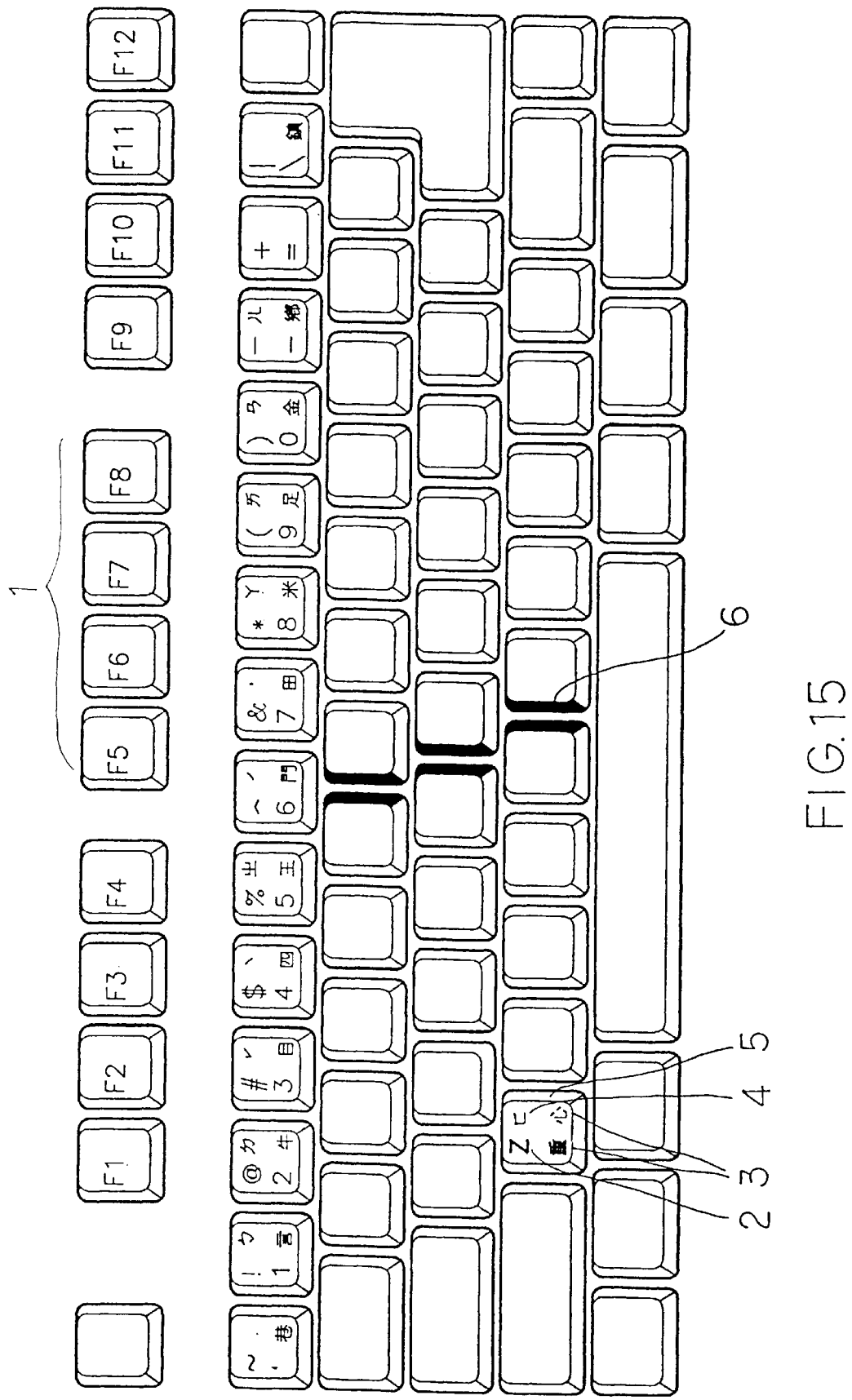
FIG. 15 shows a schematic view of the computer keyboard consisting of a key group on the basis of one English letter of Z.

The fifth kind of the keyboard includes a set of seven keys 5 of seven English letters of A, B, C, D, E, F, and G, which are similarly colored, as shown in FIG. 1, a set of nine keys 5 of nine English letters of H, I, J, K, L, M, N, O, and P, which are similarly colored, as shown in FIG. 8, a set four keys 5 of four English letters of Q, R, S, and T, which are similarly colored, as shown in FIG. 9, a set of one key 5 of one English letter of U, which is specifically colored, as shown in FIG. 12, a set of three keys 5 of three English letters of V, W, and X which are similarly colored, as shown in FIG. 13, a set of one key 5 of one English letter of Y, which is specifically colored, as shown in FIG. 14, and a set of one key 5 of one English letter of Z, which is specifically colored, as shown in FIG. 15.

The keyboard 1 of the present invention consists of the lettered keys 5, which are grouped and specifically colored to enhance the key-in efficiency of a beginner as well as an experienced person. The keys of radicals 3 and phonetic symbols 4 are similarly designed to make the computer keyboard 1 of the present invention users-friendly. In addition, the keys of the computer keyboard 1 of the present invention are colored to give an added esthetic effect to the computer keyboard 1.

The embodiment of the present invention described above is to be deemed in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A computer keyboard comprising:

keys forming a pattern consisting of a first set of seven letter keys A, B, C, D, E, F, and G that share a first color, a second set of seven similarly-colored letter keys of H, I, J, K, L, M, and N that share a second color, a third set of four similarly-colored letter keys O, P, Q, and R that share a third color, and a fourth set of eight similarly-colored letter keys S, T, U, V, W, X, Y, and Z that share a fourth color, wherein said letter keys of said first, second, third, and fourth sets have a letter, a phonetic symbol and one or more radical symbols inscribed thereon, and wherein said first, second, third, and fourth colors are all different from each other.

2. The computer keyboard of claim 1, further comprising a left-hand area and a right-hand area, said left-hand area and said right-hand area being divided by a demarcation line formed of one set of letter keys of T, G, and B on a first side of the demarcation line, and another set of letter keys Y, H, and N on a second side of the demarcation line.

3. A computer keyboard comprising:

keys forming a pattern consisting of a first set of seven similarly-colored letter keys A, B, C, D, E, F, and G that share a first color, a second set of nine similarly-colored letter keys H, I, J, K, L, M, N, O, and P that share a second color, a third set of four similarly-colored letter keys Q, R, S, and T that share a third color, and a fourth set of six similarly-colored letter keys U, V, W, X, Y, and Z that share a fourth color, wherein said letter keys of said first, second, third, and fourth sets have a letter, a phonetic symbol and one or more radical symbols inscribed thereon, and wherein said first, second, third, and fourth colors are all different from each other.

4. The computer keyboard of claim 3, further comprising a left-hand area and a right-hand area, said left-hand area and said right-hand area being divided by a demarcation line formed of one set of letter keys of T, G, and B on a first side of the demarcation line, and another set of letter keys Y, H, and N on a second side of the demarcation line.

5. A computer keyboard comprising:

keys forming a pattern consisting of a first set of seven similarly-colored letter keys A, B, C, D, E, F, and G that share a first color, a second set of seven similarly-colored letter keys H, I, J, K, L, M, and N that share a second color, a third set of four similarly-colored letter keys O, P, Q, and R that share a third color, and a fourth set of six similarly-colored letter keys S, T, U, V, W, and Y that share a fourth color, and a fifth set of two similarly-colored letter keys Z and X that share a fifth color, wherein said letter keys of said first, second, third, fourth, and fifth sets have a letter, a phonetic symbol and one or more radical symbols inscribed thereon, and wherein said first, second, third, fourth, and fifth colors are all different from each other.

6. The computer keyboard of claim 5 further comprising a left-hand area and a right-hand area, said left-hand area and said right-hand area being divided by a demarcation line formed of one set of letter keys of T, G, and B on a first side of the demarcation line, and another set of letter keys Y, H, and N on a second side of the demarcation line.

7. A computer keyboard comprising:

keys forming a pattern consisting of a first set of seven similarly-colored letter keys A, B, C, D, E, F, and G that share a first color, a second set of nine similarly-colored letter keys H, I, J, K, L, M, N, O, and P that share a second color, a third set of four similarly-colored letter keys Q, R, S, and T that share a third color, and a fourth set of two similarly-colored letter keys U and Y that share a fourth color, and a fifth set of four similarly-colored letter keys V, W, Z, and X that share a fifth color, wherein said letter keys of said first, second, third, fourth, and fifth sets have a letter, a phonetic symbol and one or more radical symbols inscribed thereon, and wherein said first, second, third, fourth, and fifth colors are all different from each other.

8. The computer keyboard of claim 7, further comprising a left-hand area and a right-hand area, said left-hand area and said right-hand area being divided by a demarcation line formed of one set of letter keys of T, G, and B on a first side of the demarcation line, and another set of letter keys Y, H, and N on a second side of the demarcation line.

9. A computer keyboard comprising:

keys forming a pattern consisting of a first set of seven similarly-colored letter keys A, B, C, D, E, F, and G that share a first color, a second set of nine similarly-colored letter keys H, I, J, K, L, M, N, O, and P that share a second color, a third set of four similarly-colored letter keys Q, R, S, and T that share a third color, a fourth set of one colored letter key U having a fourth color, and a fifth set of three similarly-colored letter keys V, W, and X that share a fifth color, a sixth set of one colored letter key Y having a sixth color, and a seventh set of one colored letter key Z having a seventh color, wherein said letter keys of said first, second, third, fourth, fifth, sixth, and seventh sets have a letter, a phonetic symbol and one or more radical symbols inscribed thereon, and wherein said first, second, third, fourth, fifth, sixth, and seventh colors are all different from each other.

10. The computer keyboard of claim 9, further comprising a left-hand area and a right-hand area, said left-hand area and said right-hand area being divided by a demarcation line formed of one set of letter keys of T, G, and B on a first side of the demarcation line, and another set of letter keys Y, H, and N on a second side of the demarcation line.

* * * * *